April 26, 1960   T. H. O'BRIEN ET AL   2,934,758
RADAR SYSTEM EVALUATOR
Filed Oct. 24, 1955
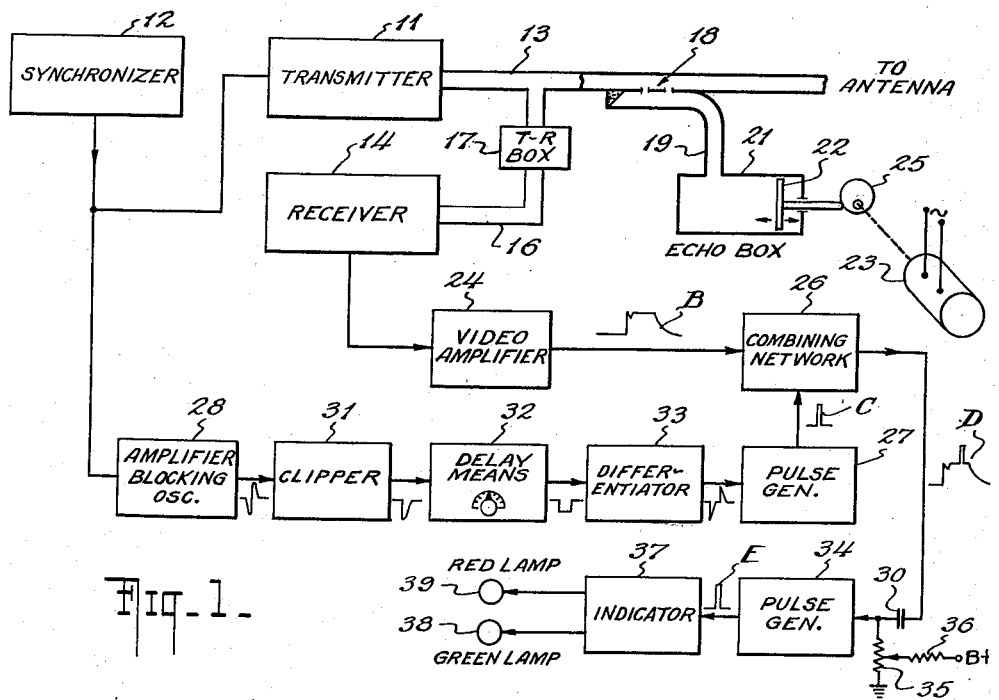
*Fig-1-*
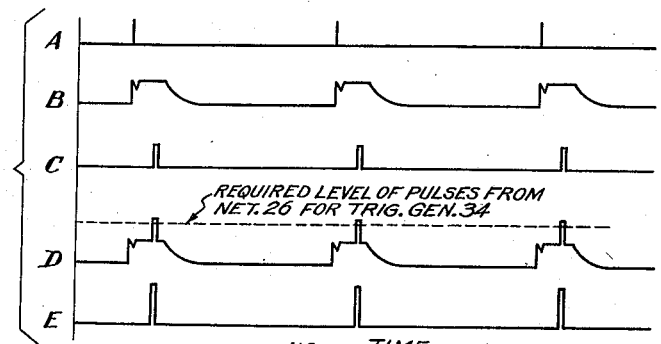
*Fig-2-*
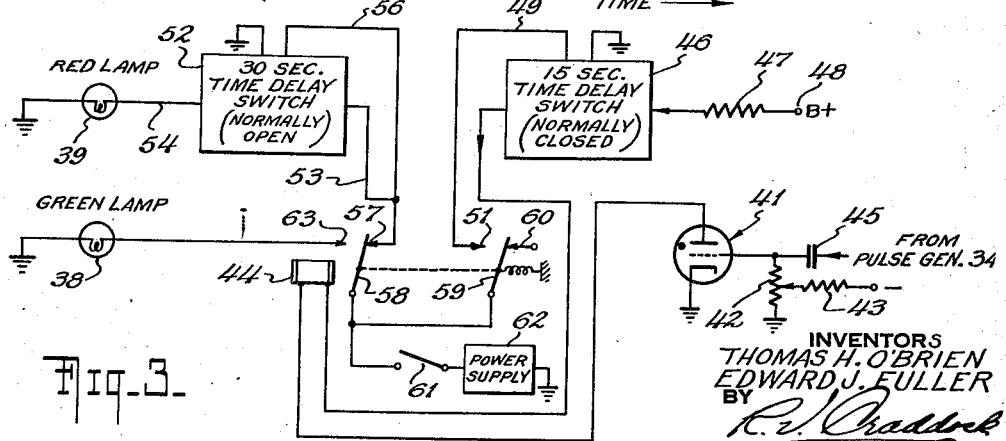
*Fig-3-*
INVENTORS
THOMAS H. O'BRIEN
EDWARD J. FULLER
BY
ATTORNEY United States Patent Office 2,934,758
Patented Apr. 26, 1960

2,934,758
RADAR SYSTEM EVALUATOR

Thomas H. O'Brien, Glen Head, and Edward J. Fuller, Garden City, N.Y., assignors to Sperry Rand Corporation, a corporation of Delaware Application October 24, 1955, Serial No. 542,349

15 Claims. (Cl. 343—17.7)

The present invention relates to radar system evaluators for ascertaining the overall operating performance of pulse radar systems.

Heretofore, it has been difficult for the operator of a radar system to quickly determine whether or not the overall performance of the system is satisfactory. Even though the system may be functioning so that radar echoes from close targets would appear on the system's indicator, there was no good way of knowing for certain whether or not the radar transmitter and receiver were functioning properly so as to adequately detect distant targets. This has been especially disadvantageous for radar systems utilized aboard an aircraft, it often being desirable to know for certain during an actual flight whether or not the radar performance is adequate.

Therefore, it is an object of the present invention to provide an improved radar system evaluator for quickly and automatically checking the overall operating performance of pulse radar systems.

It is another object of the invention to provide an evaluator as aforedescribed which gives a clear and unambiguous indication of the suitability or nonsuitability of operation of a radar system being tested.

The foregoing and other objects and advantages of the present invention, which will become more clear from the detailed description thereof further below, are obtained by utilizing an echo box tuned to resonate at the frequency of the radar system to be tested, and an indicating system including a pair of different colored lamps for providing a quick visual indication as to whether or not the radar system is functioning properly. The echo box is coupled to the radar system for receiving a portion of the transmitted energy, and is adapted to return a decaying signal back to the radar receiver for detection thereby for providing a detected video pulse waveform having a pulse duration corresponding to the ring time of the echo box. Means are provided for initiating a delayed timing pulse waveform in response to synchronizer pulses from the radar system, the delayed waveform being combined with the detected video pulse waveform from the receiver. If the delay of the timing pulse waveform is properly chosen and the radar system performs satisfactorily at or better than minimum requirements therefor, a flat portion of each detected video pulse at the receiver output will extend beyond the trailing edge of each delayed pulse. The combined output of the video and delayed pulses is chosen so the peak amplitude thereof is just high enough a value with the delayed pulses riding on the flat portions of the video pulses from the receiver for triggering of apparatus including the indicator. When the indicator is triggered, a green light thereof is turned on for indicating satisfactory radar system performance. If the aforementioned peak amplitude of the combined output is below said value, a condition incurred with too great a decrease in receiver gain and/or transmitter power output so that the flat portions of the video pulses from the receiver are too short for the delayed pulses to ride thereon, the indicator system is not triggered and a red lamp thereof is turned on for indicating unsatisfactory radar system performance.

Referring to the drawings,

Fig. 1 is a schematic block diagram of a radar system evaluator in accordance with the present invention;

Fig. 2 is a diagram of a series of waveforms at various points in the system of Fig. 1; and Fig. 3 is a schematic diagram of the indicator shown in block form in Fig. 1.

Referring to Fig. 1, the block designated by numeral 11 represents a radar transmitter of electromagnetic energy for providing a series of regularly recurrent microwave pulses at a repetition rate determined by a series of trigger pulses from a radar synchronizer 12. The output from transmitter 11 is adapted to be supplied to an antenna, not shown, by an electromagnetic wave guide 13. The wave guide 13 comprises a common path for transmitter energy and reflected energy from distant objects from the antenna, the reflected energy being transferred from wave guide 13 to a radar receiver 14 by a wave guide 16 serially connected to wave guide 13. Wave guide 16 includes a conventional TR box 17 for blocking transmitter energy from the radar receiver 14 and providing an efficient transfer of received echo energy to the receiver 14. The aforedescribed components comprise a conventional pulse radar system whose operation is evaluated by utilizing the remaining components illustrated in Fig. 1.

A directional coupler 18 is provided along the wave guide 13 between the wave guide 16 and the radar antenna for sampling a small portion of the transmitted pulse energy and supplying this portion by way of a wave guide 19 to an electromagnetic energy echo box 21. The echo box comprises a high-Q resonant cavity. It is adapted to receive the aforementioned portion of transmitted energy and, when tuned to the frequency of the radar transmitter 11, reradiates energy back into the wave guide 13 via directional coupler 18 for transmission back to the receiver 14 through the TR box 17. The length of time that the echo box 21 oscillates or rings before decaying into the noise level after each transmitter pulse is dependent on its tuning, losses in the echo box, and the shape and peak power of the pulses from transmitter 11.

A tuning plunger 22 is provided within the echo box 21 for tuning thereof. A motor 23 is coupled to the plunger 22 by suitable cam means 25 for reciprocally moving plunger 22 back and forth twice a minute, for example, for sweeping the echo box frequency over a predetermined range of frequencies known to include the carrier frequency of the pulse energy from transmitter 11. Thus, the echo box 21 is resonant to the frequency of microwave energy from transmitter 12 four times each minute. The motor 23 is turned on when the radar system is to tested so that the radar operator does not have to be concerned with tuning the test equipment to the exact frequency of the radar system. If it is desirable to manually adjust the tuning of the echo box 21 to a fixed frequency corresponding to that of the radar system, motor 23 could be omitted.

The reradiated echo box microwave energy is sent back to the receiver 14 for amplification, conversion to an intermediate frequency, detection for providing a video pulse waveform, and additional amplification in a form of level compression. Each video output pulse from the receiver 14 will have a substantially flat top with an exponentially decaying trailing edge. Since the ring time of the echo box 21 is a function of transmitter peak power, the duration of the flat tops of the detected pulses from receiver 14 are related to transmitter performance, decreasing when the peak power of the transmitted pulses decreases. Similarly, the duration of the flat top of each detected pulse from receiver 14 is also a function of receiver performance, decreasing with a reduction in receiver gain.

The video pulse output from receiver 14 is supplied to an input video amplifier 24 of the evaluator for further amplification. If for some reason the radar receiver 14 is not of a type which includes a video limiting circuit, the video amplifier 24 must be modified to limit the detected output of the receiver 14. Modifications must also be made for receivers having FTC (fast time constant) or inductance differentiation and/or any other type of anti-clutter circuits. In any event, the output from amplifier 24 should appear as pulses of waveform B in Fig. 2 whenever the radar system is functioning satisfactorily.

The output from amplifier 24 is supplied to a first input of combining network 26 having a second input coupled to a pulse generator 27 whose function will be described further below. The network 26 might comprise a pair of resistors for adding voltage waveforms from two different sources, for example, such networks being known in the art.

The output from the radar synchronizer 12 comprises the waveform A in Fig. 2, and besides being supplied to the radar transmitter 11 for triggering, is supplied to the input of an amplifier-blocking oscillator circuit 28. The output from circuit 28 should comprise a pulse of substantially constant duration having a negative and then a positive going portion after each trigger pulse from the synchronizer 12 of positive polarity, for example.

The output from the circuit 28 is supplied to the input of a diode clipper 31 for clipping the positive half of each pulse received thereby. The rectified output pulses from clipper 31 are supplied as negative trigger pulses to adjustable delay means 32 such as a monostable multivibrator or phantastron.

The delay means 32 contains an adjustable R-C timing circuit, not shown, for providing a pulse output of desired width determined by the timing circuit thereof. The output from the delay means 32 is supplied to a differentiator 33 for providing two pulses of opposite polarity at the leading and trailing edges, respectively, of each output pulse from the delay means 32.

The output from the differentiator 33 is supplied to the pulse generator 27, which is adapted to be triggered only by a positive going pulse from differentiator 33 at the trailing edge of the pulse provided by the delay means 32. The pulse generator 27, which might comprise a relaxation oscillator such as a thyratron circuit having a 0.5 microsecond delay line combined therewith in a conventional manner for providing an output pulse of one microsecond duration for each trigger supplied thereto, for example, is provided for supplying delayed pulses of waveform C of very accurate amplitude and duration to the combining network 26. The delayed pulses of waveform C are supplied to network 26 for addition with the pulses of waveform B, the pulses of waveform C being very narrow and of the order of duration of the output pulses from transmitter 11.

As indicated in Fig. 2, the pulses of waveform C are delayed from the synchronizing pulses of waveform A, this delay being a function of the state of adjustment of the delay means 32. The delay provided by the means 32 is chosen so that a pulse of waveform C will ride on top of and at the right hand end of the flat top of a pulse of waveform B when the combined performance of the radar transmitter 11 and receiver 14, i.e., transmitter peak power and receiver gain is at a minimum requirement therefor. If the radar system operates above such a minimum, the duration of the flat tops of the pulses of waveform B is large enough so that the decaying trailing edges of the pulses of waveform B occur well beyond the delayed pulses of waveform C.

The output of the combining network 26 is supplied through capacitor 30 to the input side of a pulse generator 34 such as an amplitude discriminator which gives out a standard pulse whenever it receives an input pulse that has an amplitude greater than some minimum value. The input side of generator 34, which might comprise a bistable multivibrator should be cut-off during the quiescent state thereof. A voltage divider network comprising a grounded resistor 35 having an adjustable tap thereon connected through a resistor 36 to a suitable source of positive potential, not shown, is coupled to the input side of generator 34 for regulating how far below cut-off the input side thereof is normally held. The aforementioned divider regulates the level of magnitude of the triggering voltage from network 26 required for triggering the generator 34. When the input side of generator 34 is supplied with pulses above the aforementioned level of magnitude, generator 34 provides an output pulse of predetermined amplitude and a duration corresponding to that of each pulse of waveform C. The pulse waveform E in Fig. 2 represents the output from the generator 34.

An indicator 37 is adapted to receive the pulses of waveform E from pulse generator 34 for lighting a green lamp 38 thereof when the pulses of waveform E are provided. When no such pulses are received by the indicator 37, a red lamp 39 of the indicator is adapted to be lit.

In operation of the system of Fig. 1, the pulses from the radar transmitter 11 cause the echo box 21 to ring twice during each complete cycle of plunger 22. If the transmitter pulses are of sufficient peak power so that the ring time for echo box 21 is greater than a certain minimum and the gain of receiver 14 is adequate, the delayed pulses of waveform C from the pulse generator 27 will ride on top of the horizontal or flat portions of the detected pulses of waveform B from the radar receiver 14. Thus, the pulses of waveform D are provided for triggering the pulse generator 34 into providing the pulses of waveform E and lighting of the green lamp 38 of the indicator 37.

If the peak power of the pulse energy from the radar transmitter 11 becomes less, the ring time of echo box 21 will be shorter than that mentioned above with the duration of the flat tops of the pulses of waveform B decreasing so that the pulses of waveform C may ride on the exponential portions of the pulses of waveform B or may not ride anywhere along the latter pulses. Thus, the peak amplitude of the combined pulses of waveforms B and C will not be sufficient when added by the combining network 26 to trigger the generator 34 for providing an output pulse waveform therefrom. Similarly, if the radar receiver 14 is functioning improperly so as to have too little gain, the duration of the flat top portions of the pulses of waveform B will be shorter than required so that the pulses of waveform C will fall on the trailing edges of the pulses of waveform B in the combining network 26. Thus, the peak amplitudes of the resultant output pulses of waveform D will be insufficient to trigger the pulse generator 34. Therefore, whenever the transmitter 11 and/or receiver 14 are functioning improperly, the generator 34 will not be triggered and the green lamp 38 cannot go on, the red lamp 39 going on instead.

More details of the indicator illustrated in Fig. 1 are shown in Fig. 3. The input to the indicator 37 comprises a relaxation oscillator such as a gas-filled thyratron tube 41 having a grounded cathode and a grid coupled to ground through a voltage divider resistor 42 having an adjustable tap connected through a resistor 43 to a suitable source of negative biasing potential, not shown, for regulating the firing potential of the thyratron. Capacitor 45 is provided for coupling the grid of thyratron 41 to the output of pulse generator 34. The plate of the thyratron 41 is coupled through a coil of a relay magnet 44, a normally closed time delay switch 46, and a current limiting resistor 47 to terminal 48 for receiving a positive source of supply potential, not shown.

The switch 46 comprises a conventional time delay switch such as a thermally operated hold-over relay or a time delay relay operated by a timing motor, for example. Switch 46 should be designed to be normally closed for completing the circuit between the plate of thyratron 41 and the power supply terminal 48 of resistor 47. An energizing lead 49 for switch 46 is coupled to a terminal 51. Fifteen seconds, for example, after a suitable voltage is supplied to terminal 51 and lead 49, the switch 46 should open and break the plate circuit of thyratron 41. The switch 46 should be automatically restored to its normally closed position immediately after interruption of such a voltage at terminal 51.

A further switch 52 similar to switch 46 is provided for making and breaking the connection between switch lead 53 and a switch lead 54 in series with the red indicator lamp 39. Switch 52 should be designed to be normally open. An energizing lead 56 and the lead 53 are connected to a terminal 57. Thirty seconds, for example, after a suitable voltage is supplied to terminal 57 and lead 56, the switch 52 should close and the red lamp 39 will be energized. The switch 52 should be automatically restored to its normally open position immediately after interruption of such a voltage supplied to terminal 57.

Ganged armature switch arms 58 and 59 are adapted to be connected through a further switch 61 to a suitable source 62 of power supply. The switch arms 58 and 59 are shown in their normal positions in contact with terminals 57 and 60, respectively, being actuated upon energization of the coil relay magnet 44 to move simultaneously to positions where switch arm 58 is in contact with a terminal 63 and switch arm 59 is in contact with terminal 51. Terminal 63 is in series with the green lamp 38 of indicator 37 for energization of the green lamp when the circuit through switch arm 58 and switch 61 is completed to the power supply 62.

All of the switches of Fig. 3 are illustrated in their normal positions before a test of the radar system shown in Fig. 1 is made. Before beginning a test, the power supplies for the radar and evaluator systems are turned on for a warm-up period of the tubes therein, switch 61 of the evaluator remaining open. Then, the transmitter 11 is triggered for starting the radar system's operation and the echo box motor 23 is turned on for scanning the frequency of echo box 21. When motor 23 is turned on the indicator switch 61 is closed for connecting the power supply 62 to the switch arms 58 and 59. Thus, the energizing lead 56 for the delay switch 52 is connected to the power supply 62 since switch arm 58 is normally in contact with terminal 57.

If the radar transmitter 11 or receiver 14 are functioning improperly after proceeding as mentioned in the last paragraph, the pulse generator 34 will not be triggered for providing an output for firing thyratron 41. Therefore, after a thirty second delay from the time the switch 61 is closed, the switch 52 will close and the red lamp 39 will go on since it will be connected through switches 52, 58 and 61 to the power supply 62. This condition will remain until the thyratron 41 is fired. The switch 52 is provided with a thirty second delay so that the radar system has two opportunities (the echo box being scanned through two resonances every thirty seconds as mentioned before) to prove satisfactory before the red lamp 39 goes on for indicating unsatisfactory radar system performance.

If the radar system is performing satisfactorily, the generator 34 will provide a pulse, as has been described before, for firing the thyratron 41 during each output from the echo box 21.

When the thyratron 41 is fired, a large current flows through the coil of relay magnet 44 and the normally closed delay switch 46. This causes the armature switch arms 58 and 59 to be moved into contact with terminals 63 and 51, respectively, thus disconnecting the switch 52 and the red lamp 39 from the power supply source 62, and connecting the switch 46 and green lamp 38 to source 62. Therefore, the green lamp 38 is lighted, the delay switch 52 is deenergized for return to its normally open condition, and the delay switch 46 is energized.

Fifteen seconds after connection of the energizing lead 49 of delay switch 46 to the power supply source 62, the normally closed delay switch 46 will open. Opening of the delay switch 46 breaks the connection to the source of plate supply for the thyratron 41 so that it is extinguished and current no longer flows through the coil of relay magnet 44. At this time the switch arms 58 and 59 will return to their normal positions as indicated in Fig. 3 and the green lamp 38 will go off. At the same time the delay switch 46 is automatically returned to its normally closed position. If the thyratron 41 is again triggered before 30 seconds elapses, the red lamp 39 cannot go on and the green lamp 38 will be turned on as before. Thus, if the radar system is functioning properly the green lamp 38 will be on 15 seconds, then off for a brief interval of time, and then will go back on for another 15 seconds, etc. If there is a malfunction in the radar transmitter and/or the radar receiver so that transmitter power and/or receiver gain are below par so that the overall radar system operation is below a certain minimum, the pulse generator 34 will not be triggered for firing thyratron 41 and the red lamp 39 of the indicator 37 will go on and remain on.

Accurate performance of the evaluator is based upon the radar operator's ability to properly adjust the radar receiver signal to noise ratio. This is normally done in conjunction with the radar system indicator, not shown, by adjusting the receiver gain control. If the receiver gain should drop too much in response to a decrease in the transconductance of the tubes thereof, for example, the aforedescribed evaluator would give a bad indication. The operator might rectify this condition by increasing the receiver gain while keeping a proper signal to noise ratio so that the evaluator will provide a good indication.

If the radar receiver sensitivity deteriorates due to excessive noise, the signal to noise ratio might become too small. The operator might remedy this condition by reducing the receiver gain. However, too large a reduction in the receiver gain for correcting a deterioration in receiver sensitivity due to excessive noise will cause the evaluator to give a bad indication.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Test apparatus for a microwave energy system employing a radar transmitter of microwave pulse energy and a radar receiver, said apparatus comprising, an electromagnetic energy echo box for receiving energy from said transmitter and oscillating at the microwave frequency of said received energy, said echo box being adapted to emit decaying pulse energy therefrom in response to oscillations therein for each pulse from said transmitter for transmission to said receiver, said receiver being adapted to provide detected output pulse energy in response to said decaying pulse energy from said echo box, said echo box having a ring time which is a function of the peak power of the pulse energy from said transmitter, means coupled to said radar receiver for providing a first series of pulses each of which has an edge that is delayed from a transmitter pulse by an amount that is a function of the operating performance of said radar transmitter and said radar receiver, means for providing a second series of pulses that are delayed by a fixed amount from the transmitter pulses, said last-named means being adjustable for providing a delay that is equal to a delay of said edges of the first series of pulses that would occur for a minimum desired operating performance of the transmitter and the receiver; and means responsive to said first and second series of pulses for providing information relating to the overall operating performance of said transmitter and receiver.

2. A test set for a pulse radar system having a microwave transmitter, a receiver, and an electromagnetic energy echo box coupled to said radar system for sampling radar pulse energy from said transmitter and reradiating echo pulse energy back to said receiver for detection, said test set comprising: first input means for receiving detected echo box pulse energy from the radar receiver, the delay between the leading and trailing edges of each detected pulse being a function of the operating performance of said radar system, second input means for receiving trigger pulses having a timing which is a function of the timing of transmitted radar pulse energy, adjustable means for responding to said trigger pulses for providing delayed test pulses having a delay corresponding to a predetermined delay between the leading and trailing edges of each detected echo box pulse indicative of a minimum operating performance for said radar system, and means for comparing the delay of said test pulses with the delay between the leading and trailing edges of said detected pulses for providing an indication of the operating performance of said radar system.

3. A test set for a pulse radar system having a microwave transmitter, a receiver, and an electromagnetic energy echo box coupled to said radar system for sampling radar pulse energy from said transmitter and reradiating echo pulse energy back to said receiver for detection, said test set comprising: first input means for receiving detected pulse energy from the radar receiver, second input means for receiving trigger input pulses having the same timing as the transmitted radar pulse energy, means coupled to said second input means for providing delayed pulses of fixed characteristics and a predetermined delay relative to said trigger input pulses, means coupled to said last-named means and said first input means for providing a combined output of said detected pulse energy and said delayed pulses for providing an output waveform indicative of the overall operating performance of the radar system, and indicator means coupled to the output of said combining means, said indicator means having a first operating state for providing a first indication whenever the output from said combining means is below a predetermined peak level of magnitude and having a second operating state for providing a second indication in response to an output from said combining means above said predetermined level of magnitude.

4. A test set as set forth in claim 3, further including a pulse generator between said combining means and said indicator means, said pulse generator being adapted to provide a pulse output each time the output from said combining means is above said peak level for driving said indicator means into its second operating state.

5. A test set as set forth in claim 4, wherein said indicator means includes a normally cut-off relaxation oscillator tube adapted to be fired by a pulse from said pulse generator for conduction and driving said indicator into its second state of operation, and means for extinguishing said relaxation oscillator at the end of a predetermined time interval after it is driven into conduction until another firing pulse from said pulse generator is received.

6. A radar system evaluator, comprising an echo box for receiving a series of regularly recurrent microwave energy pulses and reradiating microwave energy after each pulse for a ring time which is a function of the peak power of said pulses, radar receiver means coupled to said echo box for receiving and providing a detected output of the reradiated microwave energy therefrom, means for providing a series of recurrent unidirectional pulses of substantially constant shape having the same recurrence rate as said microwave energy pulses and having a predetermined delayed relationship relative to said microwave energy pulses, means coupled to said last-named means and the output of said radar receiver whereat said detected output is provided for combining said detected output and said unidirectional pulses of predetermined delay for providing an output waveform having a peak amplitude related to radar system performance, and means responsive to the output waveform of said last-named means for providing a predetermined indication for a fixed time interval after said peak amplitude rises above a predetermined level.

7. A radar system evaluator as set forth in claim 6, wherein said last-named means includes a pulse generator having an input circuit for regulating the level of magnitude which the peak amplitude of the output waveform from said combining means must exceed for triggering of said pulse generator.

8. A radar system evaluator as set forth in claim 7, wherein said indicator includes means for providing a first indication in the absence of a pulse from said pulse generator and means for providing a second indication for a predetermined time after the presence of a pulse from said pulse generator.

9. In combination, a radar system having a pulse transmitter of microwave energy and a receiver tuned to the microwave frequency of said transmitter for providing a video pulse output in response to detected energy from that received by reflection from distant objects, an echo box coupled to said radar system for receiving a portion of the microwave energy from said transmitter and reradiating energy back to said receiver for a ring time which is a function of the output of said pulse transmitter, means for providing delayed pulses of predetermined magnitude and delay relative to pulses from said transmitter, means coupled to said last-named means and said receiver for response to said delayed pulses and said video output from said receiver for providing a combined output waveform, and means responsive to the output waveform of said combining means for providing a first indication for a waveform having a peak amplitude above a predetermined magnitude and a further indication for a waveform having a peak amplitude below a predetermined magnitude.

10. Test apparatus for evaluating the overall operating performance of a radar system including a pulse transmitter of electromagnetic energy at a microwave frequency, a synchronizer coupled to said transmitter for triggering thereof, and a radar receiver for providing detected video pulse output energy in response to microwave pulses received thereby, said apparatus comprising a tuned echo box coupled to said radar system for receiving a portion of the energy from said radar transmitter for oscillation at said microwave frequency and retransmission of electromagnetic energy at said microwave frequency back to said receiver, means including said receiver for providing a detected output of amplified video pulse energy in response to retransmitted echo box energy, the waveform of said output including pulses having flat tops corresponding to video limiting of said last means and decaying trailing edges with the time duration of said flat tops being a function of radar receiver and transmitter performance, further means coupled to said synchronizer for providing a further pulse waveform of delayed characteristics relative to an output pulse waveform provided by said transmitter, the pulses of said further pulse waveform being of the order of duration of the pulses provided by said transmitter and delayed relative thereto for a time just less than a predetermined duration for the flat tops of said detected output energy for minimum radar system performance, and combining means coupled to said receiver and said means for providing said further pulse waveform for providing an output whose characteristics are a function of overall radar transmitter and receiver operating performance.

11. Test apparatus as set forth in claim 10, further including means coupled to said combining means for providing an output trigger pulse whenever the peak magnitude of the combining means output is above a predetermined minimum level corresponding to minimum desirable radar system operating performance, and indicator means coupled to said last-named means for response to an output trigger pulse from said combining means for providing an unambiguous indication of satisfactory radar system performance.

12. Test apparatus as set forth in claim 11, wherein an amplitude discriminator is coupled to the output of said combining means for response to pulse above a predetermined magnitude from said combining means for triggering said indicator.

13. Test apparatus for a microwave system having a radar transmitter for providing a series of regularly recurrent microwave pulses at a predetermined repetition rate, a radar receiver, and an electromagnetic energy echo box coupled to said system for sampling microwave pulses from said transmitter and reradiating echo pulses back to said receiver for detection thereby, said apparatus comprising: first means responsive to detected energy from the radar receiver for providing a first series of pulses each having an edge that is delayed relative to preceding microwave pulses of the transmitter by an amount that is indicative of transmitter-receiver operating performance, second means for providing a second series of pulses having a fixed delay relative to radar transmitter pulses, said fixed delay being a standard that equals the delay between said edges of the first series of pulses and the preceding transmitter pulses which is indicative of a minimum combined operating performance of the transmitter and the receiver, and means for providing information which is a function of the timing relationship between said delayed edges of said first series of pulses and said second series of pulses.

14. Test apparatus as set forth in claim 13, wherein said means for providing said second series of pulses includes adjustable means for providing a series of output pulses whose width corresponds to said fixed delay and whose repetition rate corresponds to the repetition rate of microwave pulses from the radar transmitter, and means including a differentiator for providing an output pulse that occurs at the trailing edge of each output pulse from said delay means.

15. Test apparatus for a microwave energy system employing a radar transmitter of microwave pulse energy and a radar receiver, said apparatus comprising, an electromagnetic echo box for receiving energy from said transmitter and oscillating at the microwave frequency of said received energy, said echo box being adapted to emit decaying pulse energy therefrom in response to oscillations therein for each pulse from said transmitter for transmission to said receiver, said receiver being adapted to provide detected output pulse energy in response to said decaying pulse energy from said echo box, said echo box having a ring time which is a function of the peak power of the pulse energy from the transmitter, means for providing a pulse of predetermined fixed characteristics and delay relative to each pulse of microwave energy from said transmitter, said delay being equal to a delay between the leading and trailing edges of each detected pulse that is indicative of a minimum combined operating performance of the transmitter and the receiver, and means for providing a combined output waveform whose shape is a function of the operation performance of said transmitter and receiver in response to the detected energy of said receiver and said delayed pulses.

References Cited in the file of this patent
UNITED STATES PATENTS

| | | |
|---|---|---|
| 2,432,180 | Tourshou | Dec. 9, 1947 |
| 2,549,131 | Rideout | Apr. 17, 1951 |